June 4, 1968 E. A. DOYLE ET AL 3,386,716
APPARATUS FOR PREFOAMING OF EXPANDABLE SYNTHETIC RESIN SUCH
AS STYRENE POLYMER COMPOSITION CONTAINING
A VOLATILE ORGANIC LIQUID
Filed March 5, 1965 3 Sheets-Sheet 1
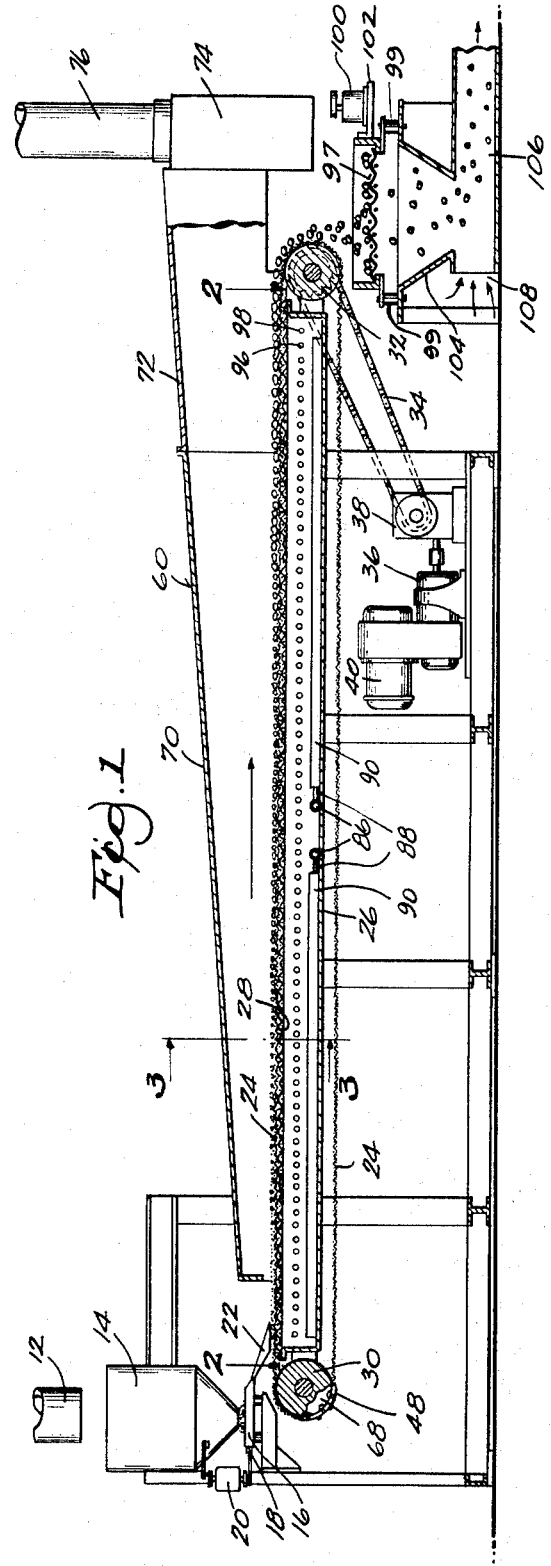
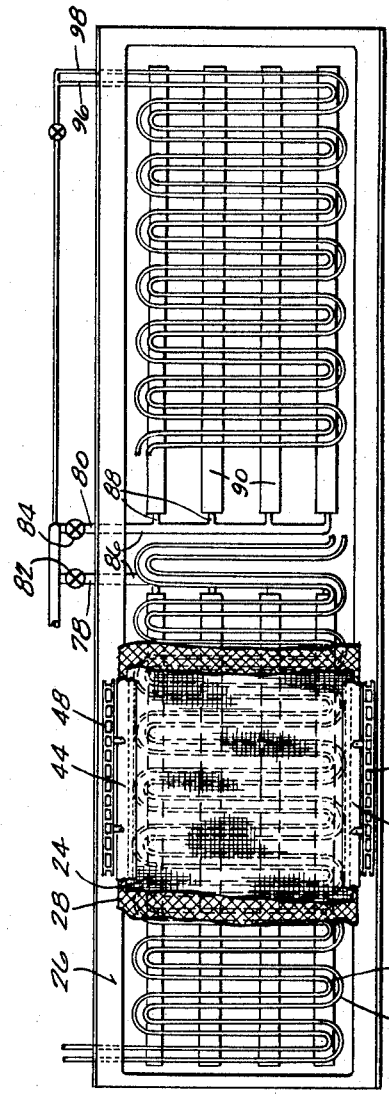
INVENTORS
EDWARD A. DOYLE
DONALD E. STEVENS
BY
Wheeler, Wheeler & Wheeler
ATTORNEYS

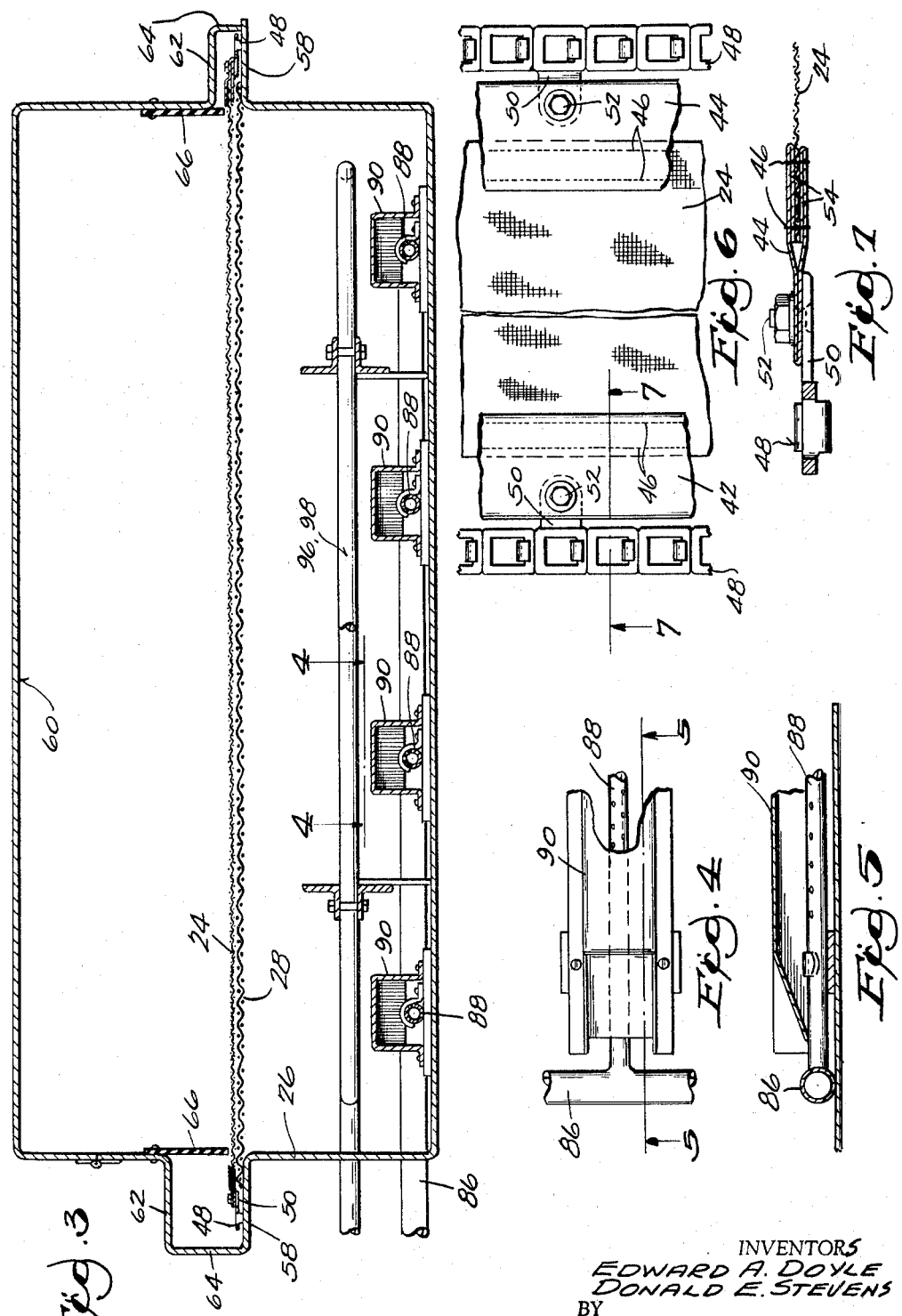

June 4, 1968
E. A. DOYLE ET AL
3,386,716
APPARATUS FOR PREFOAMING OF EXPANDABLE SYNTHETIC RESIN SUCH
AS STYRENE POLYMER COMPOSITION CONTAINING
A VOLATILE ORGANIC LIQUID
Filed March 5, 1965
3 Sheets-Sheet 3
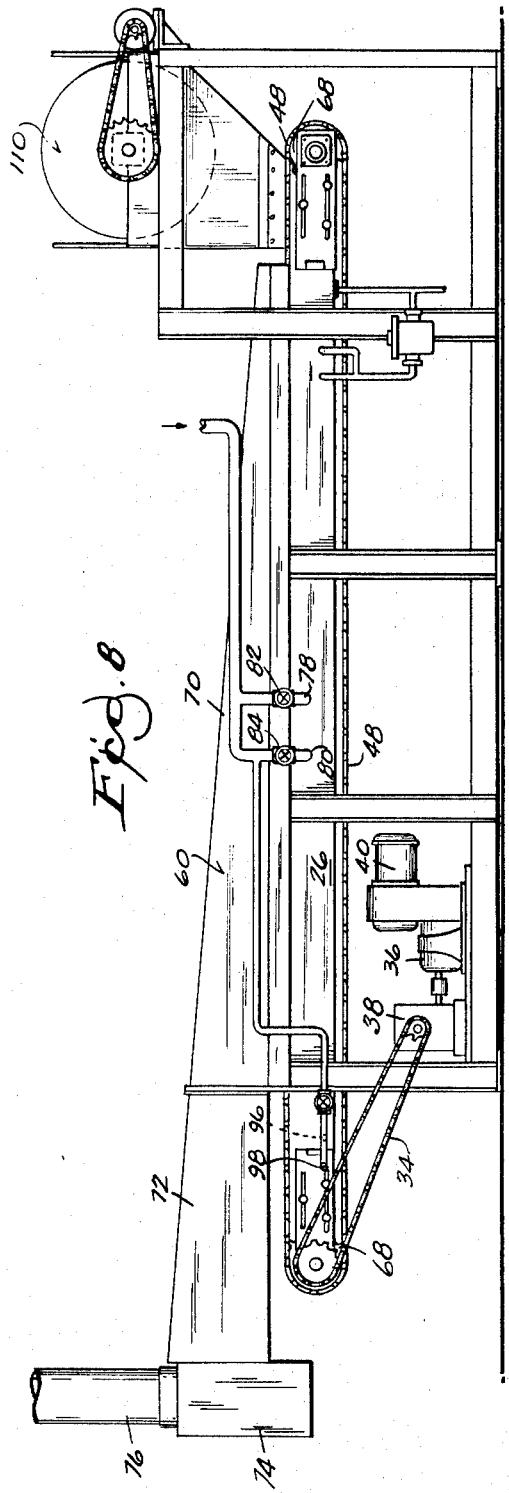
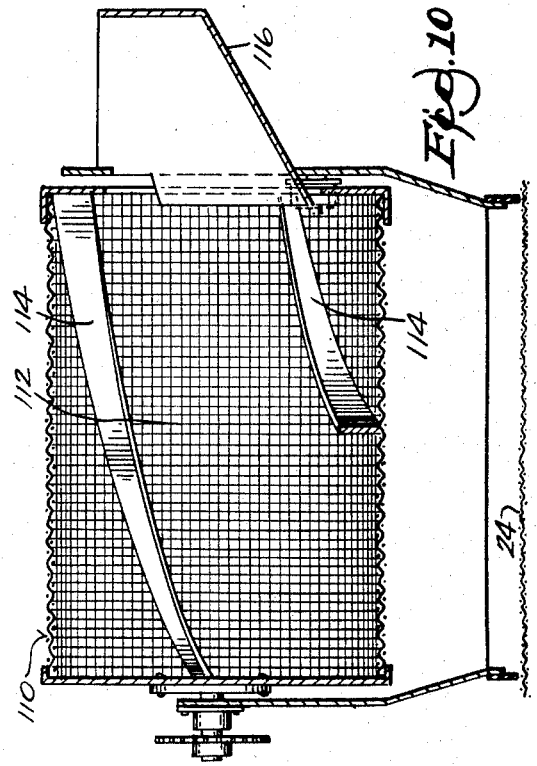
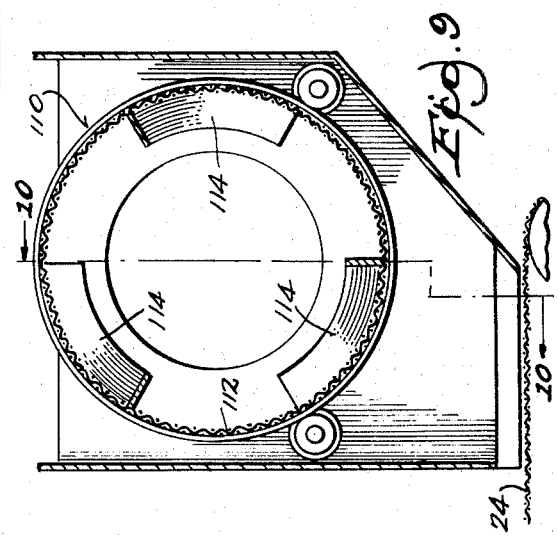
INVENTORS
EDWARD A. DOYLE
DONALD E. STEVENS
BY Wheeler, Wheeler + Wheeler
ATTORNEYS

United States Patent Office 3,386,716
Patented June 4, 1968

3,386,716
APPARATUS FOR PREFOAMING OF EXPANDABLE SYNTHETIC RESIN SUCH AS STYRENE POLYMER COMPOSITION CONTAINING A VOLATILE ORGANIC LIQUID
Edward A. Doyle and Donald E. Stevens, Sheboygan Falls, Wis., assignors to Kohler General, Inc., a corporation of Wisconsin
Filed Mar. 5, 1965, Ser. No. 437,364
7 Claims. (Cl. 263—21)

ABSTRACT OF THE DISCLOSURE

Particulate foamable resin distributed in a thin layer on a screen belt is prefoamed in a progressively expanding chamber by concurrently subjecting it to steam and dry heat, the material being exposed to dry heat alone in a latter part of its traverse of the chamber, thus eliminating drying time previously required, the material being vibrated upon discharge to eliminate clumping.

---

This inventon relates to the prefoaming of expandable synthetic resin such as styrene polymer composition containing a volatile organic liquid.

For our particular purposes, the invention contemplates that the foamable resin will desirably be in the form of pellets of a size comparable to sugar or salt. These will be distributed, preferably in a thin layer, upon a screen belt which, in our practice, is a 40 x 40 mesh stainless steel belt. On this belt, the particulate foamable material advances through a chamber in which it is subjected both to wet and dry heat to effect prefoaming or partial expansion of the individual particles. Live steam is desirable to initiate the prefoaming but, in the open hood shown, it condenses at 212°.

The temperature to which the particles of expandable material should be exposed is critical, being in the neighborhood of 240° F. It is high enough so that there is considerable condensation if live steam alone is relied upon to achieve any comparable temperature. Previous equipment for prefoaming has delivered the prefoamed material sufficiently wet so that up to twenty-four hours of drying time in an aerated bin has been required, followed by de-clumping treatment.

In the instant device, condensation is virtually eliminated and a much more uniform temperature maintained by providing two sets of heaters beneath the belt, one heater providing continuous dry heat for substantially the whole length of the chamber and other heaters being arranged in sequence for delivering live steam beneath the belt or beneath selected portions of the belt, the usual arrangement being such that the belt and the pellets to be prefoamed are exposed to live steam only during their initial travel through the chamber and to additional dry heat not only in the initial section but throughout the chamber. The radiant dry heat maintains the temperature in the hood far above the condensation point and the vapor is carried off without wetting the work beyond the capacity of the terminal heater to deliver the work dry or substantially so, all vapor being carried away as rapidly as condensation forms so that the pellets issue substantially dry.

As a result of these features, the prefoamed pellets are produced with an increased degree of uniformity and at a rate which is approximately three times the rate of production in the best competitive equipment.

The partially expanded material is delivered from the chamber onto a vibratory screen which breaks any slight adhesion between particles and discharges the prefoamed particles in relatively dry condition into a pneumatic convection system by which they are conveyed to the point of storage or use.

The invention has both method and apparatus aspects.
In the drawings:

FIG. 1 is a view partially in side elevation and partially in longitudinal section through equipment for practicing the invention, parts being broken away.

FIG. 2 is a plan view taken on line 2—2 of FIG. 1 of the pan which provides the bottom portion of the heating chamber, portions of the belt being superimposed thereon and parts of the heating elements being broken away.

FIG. 3 is an enlarged view taken in cross section on the line 3—3 of FIG. 1.

FIG. 4 is a fragmentary detail view taken in the plane indicated at 4—4 in FIG. 3.

FIG. 5 is a fragmentary detail view taken in section on the line 5—5 of FIG. 4.

FIG. 6 is an enlarged fragmentary detail view showing in plan a preferred form of conveyor belt.

FIG. 7 is a detail view taken in section on line 7—7 of FIG. 6.

FIG. 8 is a view partially in side elevation showing a modified prefoaming device, parts being broken away.

FIG. 9 is a greatly enlarged detail view taken in transverse section through a distributing screen covered drum which is a part of the apparatus shown in FIG. 8.

FIG. 10 is a view taken in section on line 10—10 of FIGURE 9.

It will be understood that details given herein are supplied to exemplify the best means known to us for practicing the invention. They are given by way of example and not by way of limitation.

In the preferred construction shown in FIGS. 1 to 7, the particulate foamable material is delivered in any desired manner, as by pipe 12 into a hopper 14 from which it issues onto a vibrating pan 16 which is closed at its rear margin 18 and reciprocated by a vibrating motor 20 to discharge the particles of material down the chute 22 onto the belt 24. The pellets may be placed on the belt to any desired depth, but to minimize adhesion of pellets to each other and to promote uniformity of exposure to heat it is preferred to spread the pellets on the belt in a single layer. The material as supplied to the machine appears like coarse sugar or salt.

A belt 24 which has been used successfully is 40 x 40 mesh stainless steel screen cloth. The pan 26 in which the heating equipment is housed is spanned by an expanded metal web 28 which provides a foraminous support across which the work supporting run of belt 24 moves between the pulleys 30 and 32. The pulley 32 is driven by a chain 34 through speed reducers 36 and 38 from motor 40.

We have found that the screen cloth belt 24 will not run true without special guide means. A preferred construction will briefly be described herein. As best shown in FIGS. 2, 6 and 7, bands 42 and 44 are connected to the sides of belt 24. In practice, these bands are made of polyethylene fixed to the belt by spaced rows of stitching at 46. Beside each polyethylene band runs a link chain 48. Certain of the links are provided with laterally projecting arms at 50 to which the respective bands are connected as by bolts 52. As best shown in FIG. 7, the bands are preferably strengthened by being folded upon themselves and the margins stitched to the belt are reversely folded again at 54 so that the stitching 46 goes through four plies of each such band, with the margin of belt 24 centered between these plies.

The chains 48 ride on the out-turned margins 58 of pan 26 and are thus outside of the treatment zone. This is best shown in FIG. 3 wherein the hood 60 is illustrated in cross section. This hood has lower marginal flanges turned outwardly at 62 and downwardly at 64 to engage flanges 58 outside of the path of the chains 48. Thus, each chain operates in a recess offset from the feeding chamber and the bottom of which is the flange 58 of pan 26. Preferably, flexible aprons 66 of natural or synthetic rubber are attached to the hood 60 and have their lower margins closely proximate the screen cloth conveyor belt 24 to segregate the work supporting areas of the belt from the side margins thereof which are fastened to the chains. It will be understood that chain sprockets 68 are provided coaxially with the belt guide pulleys 30 and 32.

The hood 60 progressively increases in height above the belt as clearly shown in FIG. 1. Removable section 70 thereof is joined to a relatively fixed section 72 which leads to the inlet 74 of a casing with which the vent pipe 76 communicates to carry off all vapor from the hood as rapidly as vapor is formed by condensation of the steam. The fact that the section 70 is removable facilitates access to the screen cloth conveyor belt for cleaning or other purposes.

Within the pan 26 heating means is provided for delivering both steam and dry heat to work transported on the conveyor belt 24. The live steam may be provided by plural heater sections although only one is normally used. The sections have separate supply lines 78 and 80 with separate valves 82, 84 as shown in FIG. 2. Each section comprises a header 86 from which perforated steam discharge pipes 88 lead longitudinally of pan 26 beneath inverted channels 90. These channels are entirely open along their lower margins and serve to distribute the steam substantially uniformly throughout the cross section of the pan 26. The steam passes upwardly through the expanded metal support 28 and the superimposed portions of the mesh conveyor belt 24 to act on the particulate work which is being transported through the treatment chamber beneath hood 60 on the surface of the belt.

Between the steam pipes 88 and the work are to and fro convolutions 92 and 94 of steam pipes 96 and 98 which, for convenience, are arranged in parallel as best shown in FIG. 2 and are continuous from their input ends at the right of FIG. 2 to their discharge ends at the left of FIG. 2. These exemplify any desired dry heating means, whether electrical or steam or hot water, from which steam does not escape. It is found that the continuous dry heat provided by the element or elements 92, 94 maintains a desirably higher temperature about the work than would be provided by live steam alone and it also minimizes condensation either on the work or on the belt. In addition, the progressively increasing cross section of hood 60 and the association thereof with vent pipe 76 results in isolating above the work the level at which condensation occurs and withdraws the condensate vapor as fast as it condenses.

It is found that in practice it is not normally necessary to operate but one section of the live steam heater. Normally, therefore, the valve 84 is closed and as the work approaches the delivery end of the machine it is exposed to dry heat only so that it is delivered substantially dry over the pulley 32.

Upon delivery of the material, it is received by vibratory screen 97 which, by way of example, may be supported on rubber mounts 99 and caused to vibrate in any manner, as, for example, by an unbalanced motor 100 supported on an arm 102 projecting from the screen as shown in FIG. 1. The purpose of this screen is to separate from each other any of the prefoamed particles of material which may tend to be adherent. However, adhesions are minimized by the fact that the particles are delivered dry and have never been unduly moistened.

As the separated particles fall through the screen 97, they are guided by a hopper 104 into a convection delivery pipe 106 into which air is being drawn through its suction end 108 to serve as a convection fluid for propelling the material to a point of storage or use.

The device shown in FIGS. 8 to 10 is essentially like that above described, differing primarily in the fact that the raw particulate pellets of foamable material are distributed over the surface of the belt 24 by means of a drum 110 which is mounted for rotation as shown in FIG. 9 and has a screen cloth periphery 112 provided with oblique or helical flights 114 which tend to feed the material across the drum from the hopper 116 through which the material is admitted to the drum near one of its ends. Any clumped pellets arriving through the hopper 116 will be broken up by the rotation of the drum. The flights 114 will feed material axially of the drum until it falls through the screen cloth 112 onto the belt 24 and it has been found that this device will achieve an effective distribution of the particulate material with considerable uniformity across the area of the belt (as does the shaker 18 and chute 22 shown in FIG. 1).

No claim is made to the prefoaming of expandable material by subjecting it to the heat on a screen cloth belt. The particular belt used, while believed to be new, is not being claimed herein. The particular features as to which the claims are directed include the exposure of particulate foamable material, preferably distributed in a layer of single particle thickness, to a combination of wet and dry heat provided by live steam and radiant heaters to maintain a precisely controlled temperature at a critical value which achieves the desired expansion of the material in minimum time and delivers it substantially dry and without substantial adhesions, in readiness for immediate use in molding, or for storage if immediate use is not desired. As explained above, the live steam desired to initiate foaming can be used in each of the successive treatment zones if desired. Even if used in both zones, it will not unduly moisten the work particles because of the drying effect of the radiant heat to which such particles are exposed at temperatures far above 212° F., preferably throughout their travel through the successive treatment zones. In actual operation, the use of live steam is preferably limited to the first zone, where it acts along with the dry heat. For the remainder of the path of travel of the work, it is exposed to dry heat only.

It may be noted that the progressively increasing cross section of the hood 60 has also been found to be a significant improvement. With a hood which closely confines the material throughout its path of travel, the moisture condensed from the steam remains in intimate contact with the work and the work is not permitted to dry. The combination of the dry heat beneath the belt and the progressively increasing cross section of the hood results in the vapor being lifted free of the work and discharged through the vent pipe 76, thus leaving the work exposed only to dry heat for the remainder of its travel through the hood.

We claim:

1. Apparatus for prefoaming particulate expandable synthetic resinous material, said apparatus comprising means for subjecting the particulate material to live steam and concurrently to sufficient dry heat so that the ambient vapor about the material is at a temperature approximating 240° F.

2. Apparatus for prefoaming expandable resinous material in particular form, such apparatus including the combination with a foraminous conveyor belt and means for distributing the material thereon, of a hood partially enclosing a part of the travel of said belt, the material on the belt remaining substantially at atmospheric pressure, means for delivering live steam into contact with the particulate material on the belt within the hood, means for withdrawing from under the hood such vapor as condenses sufficiently to wet the material, and means for delivering dry heat to such material and to the steam within the hood in amount sufficient to maintain the material within the hood subject to a temperature approximating 240° F.

3. Apparatus for prefoaming of expandable resinous material in particulate form, such apparatus comprising an elongated hood, a foraminous conveyor belt having a portion extending through the hood, means for supporting the conveyor belt portion aforesaid, means for distributing the particulate expandable material onto said belt to travel with said portion through said hood, means for delivering live steam into contact with particulate material upon said conveyor belt portion, means for establishing a plurality of zones within said hood and for separately determining whether such material will be exposed to live steam in each zone, and means for subjecting the particulate material to dry radiant heat throughout at least a major portion of its travel through said hood and for thereby maintaining the temperature to which the particulate material is subject within the hood at a point greatly in excess of 212° F.

4. Apparatus according to claim 3 in which said hood has progressively increasing cross section in the direction of travel of the particulate material upon said conveyor belt, whereby the dry heat from said radiant source tends to elevate the live steam materially above said material before condensation occurs, said hood having an exhaust vent connection for the removal of condensed vapor, whereby the prefoamed material is discharged from the conveyor in a condition substantially dry.

5. Apparatus for the prefoaming of expandable resinous material in particulate form, such apparatus comprising an elongated hood, a woven conveyor belt having a portion extending through the hood, a pan beneath the hood, means for supporting said portion including a foraminous support spanning the pan and upon which said portion of the woven conveyor belt is carried, means for delivering the particulate material onto the belt to pass through said hood, means for releasing live steam into at least a portion of the pan beneath the foraminous support and the woven belt for the treatment of material on said belt portion, and radiant heating means disposed within the pan and extending substantially continuously beneath the foraminous support and the belt portion aforesaid, and being adapted to raise the temperature of the expandable material on said belt portion to a level materially in excess of 212° F.

6. Apparatus for the preforming of expandable resinous material in particulate form, such apparatus comprising an elongated hood, a woven conveyor belt having a portion extending through the hood, a pan beneath the hood, means for supporting said portion including a foraminous support spanning the pan and upon which said portion of the woven conveyor belt is carried, means for delivering the particulate material onto the belt to pass through said hood, means for releasing live steam into at least a portion of the pan beneath the foraminous support and the woven belt for the treatment of material on said belt portion, and radiant heating means disposed within the pan and extending substantially continuously beneath the foraminous support and the belt portion foresaid, and being adapted to raise the temperature of the expandable material on said belt portion to a level materially in excess of 212° F., guide means connected with the sides of said belt, and means providing travel paths and support for said guide means at opposite sides of the belt.

7. Apparatus for the prefoaming of expandable resinous material in particulate form, such apparatus comprising an elongated hood, a woven conveyor belt having a portion extending through the hood, a pan beneath the hood, means for supporting said portion including a foraminous support spanning the pan and upon which said portion of the woven conveyor belt is carried, means for delivering the particulate material onto the belt to pass through said hood, means for releasing live steam into at least a portion of the pan beneath the foraminous support and the woven belt for the treatment of material on said belt portion, and radiant heating means disposed within the pan and extending substantially continuously beneath the foraminous support and the belt portion aforesaid, and being adapted to raise the temperature of the expandable material on said belt portion to a level materially in excess of 212° F., guide means connected with the sides of said belt, means providing travel paths and support for said guide means at opposite sides of the belt, and means between the hood and the guide means and comprising flexible aprons laterally adjacent said belt portion and attached to the hood at opposite sides of said belt portion and constituting means tending to exclude steam from direct contact with said guide means.

References Cited
UNITED STATES PATENTS

| | | | |
|---|---|---|---|
| 2,704,040 | 3/1955 | Warrington | 34—216 X |
| 3,147,321 | 9/1964 | Oswald et al. | 34—216 X |
| 3,224,452 | 12/1965 | Franklin et al. | 34—12 X |
| 3,263,981 | 8/1966 | Lowry. | |

JOHN J. CAMBY, *Examiner.*

FREDERICK L. MATTESON, JR., *Primary Examiner.*